US008785812B2

(12) United States Patent
Grundmüller et al.

(10) Patent No.: US 8,785,812 B2
(45) Date of Patent: Jul. 22, 2014

(54) TABLE FOR RECEIVING A WORKPIECE AND METHOD FOR PROCESSING A WORKPIECE ON SUCH TABLE

(75) Inventors: Richard Grundmüller, München (DE); Johannes Meier, Corcelles (CH); Arthur Büchel, Ruggell (LI)

(73) Assignee: Tel Solar AG, Truebbach (CH)

( * ) Notice: Subject to any disclaimer, the term of this patent is extended or adjusted under 35 U.S.C. 154(b) by 1138 days.

(21) Appl. No.: 11/597,856

(22) PCT Filed: May 27, 2005

(86) PCT No.: PCT/CH2005/000300
§ 371 (c)(1),
(2), (4) Date: Jun. 4, 2007

(87) PCT Pub. No.: WO2005/118400
PCT Pub. Date: Dec. 15, 2005

(65) Prior Publication Data
US 2007/0228630 A1 Oct. 4, 2007

(30) Foreign Application Priority Data
Jun. 3, 2004 (CH) .................................. 935/04

(51) Int. Cl.
*B23K 26/00* (2014.01)
*B25B 1/22* (2006.01)
*B26D 7/06* (2006.01)
*B26F 3/00* (2006.01)
*B23K 26/14* (2014.01)
*B23K 26/42* (2006.01)
*C03B 33/037* (2006.01)
*B65G 49/06* (2006.01)
*B28D 5/00* (2006.01)
*B23K 26/40* (2014.01)
*C03B 33/08* (2006.01)
*C03B 33/03* (2006.01)
*B23K 26/10* (2006.01)
*C03B 33/09* (2006.01)

(52) U.S. Cl.
CPC .............. *B65G 49/061* (2013.01); *B23K 26/14* (2013.01); *B23K 26/422* (2013.01); *C03B 33/037* (2013.01); *B65G 49/065* (2013.01); *B28D 5/0082* (2013.01); *B65G 2249/045* (2013.01); *B23K 26/408* (2013.01); *C03B 33/082* (2013.01); *C03B 33/03* (2013.01); *B65G 2249/04* (2013.01); *B23K 26/10* (2013.01); *C03B 33/093* (2013.01)
USPC ............ 219/121.69; 219/121.82; 219/121.67; 219/121.72; 219/121.76; 219/121.77; 269/71; 269/16; 269/21; 269/30; 269/41; 83/152; 83/155.1; 83/319; 83/365; 83/880; 225/2; 225/96.5; 225/103; 144/373; 144/242.1; 144/245.1; 144/375

(58) Field of Classification Search
USPC ........... 269/71, 16, 21, 22, 28, 30, 32, 35, 37, 269/41–45, 50, 55, 81, 87.3, 88; 83/152, 83/155.1, 319, 365, 879, 13, 880–887, 83/98–100, 294; 225/2, 96.5, 103; 144/373, 2.1, 242.1, 245.1, 375; 219/121.69, 121.82, 121.67, 121.72, 219/121.76, 121.77
See application file for complete search history.

(56) References Cited

U.S. PATENT DOCUMENTS

| | | | |
|---|---|---|---|
| 3,388,843 A | 6/1968 | Umbel | |
| 4,646,814 A * | 3/1987 | Fennesz | 165/56 |
| 4,895,244 A | 1/1990 | Flaugher et al. | |
| 5,003,729 A | 4/1991 | Sherby | |
| 5,205,196 A * | 4/1993 | Blaimschein | 83/272 |
| 5,916,460 A | 6/1999 | Imoto et al. | |
| 5,944,244 A * | 8/1999 | Lisec | 225/96.5 |
| 6,173,648 B1 * | 1/2001 | Misono et al. | 101/474 |
| 6,272,989 B1 * | 8/2001 | Misono et al. | 101/474 |
| 6,463,762 B1 | 10/2002 | Ross, Jr. | |

| | | | |
|---|---|---|---|
| 7,207,250 B2* | 4/2007 | Lisec | 83/152 |
| 2002/0060210 A1* | 5/2002 | Terada et al. | 219/121.76 |
| 2003/0159769 A1 | 8/2003 | Ogimoto et al. | |
| 2004/0083862 A1* | 5/2004 | Mikkelsen et al. | 83/13 |
| 2004/0099642 A1 | 5/2004 | Sonoda et al. | |

FOREIGN PATENT DOCUMENTS

| | | |
|---|---|---|
| EP | 1 405 832 | 4/2004 |
| EP | 1405832 | 4/2004 |
| JP | 1 009826 | 1/1989 |
| JP | 04361890 | 12/1992 |
| JP | 07-010266 | 1/1995 |
| JP | 08-143323 | 6/1996 |
| JP | 9 320939 | 12/1997 |
| JP | 2004-114066 | 9/2002 |
| WO | WO03086917 | 10/2003 |

* cited by examiner

*Primary Examiner* — Dana Ross
*Assistant Examiner* — Ket D Dang
(74) *Attorney, Agent, or Firm* — Notaro, Michalos & Zaccaria P.C.

(57) ABSTRACT

The present invention relates to a device for the treatment of a workpiece, in particular of a substantially flat substrate, comprising a table (2) for supporting the workpiece (5), a flow generation apparatus (6, 11) producing a gas flow (22) on a top face (17.1, 17.2) of the table (2) in a region between the workpiece (5) and the top face (17.1, 17.2) of the table (2), on which gas flow the workpiece (5) is supported during the treatment.

20 Claims, 4 Drawing Sheets

TABLE FOR RECEIVING A WORKPIECE AND METHOD FOR PROCESSING A WORKPIECE ON SUCH TABLE

FIELD OF THE INVENTION

The invention relates to a table for receiving a workpiece according to the pre-characterizing clause of Claim 1 and a method for processing a workpiece on a table according to the invention. Such tables are used, for example, for the processing of plate-like workpieces, such as glass plates, by means of lasers, for example for laser scribing or cutting.

PRIOR ART

It is known that glass plates and similar workpieces can be clamped at two opposite edges and processed, usually from the top. In the case of large-area thin workpieces, however, there is always a sag which influences the distance between workpiece and processing device in a manner which is not completely controllable, necessitating at least further precautions in the case of high accuracy requirements, in certain circumstances also not permitting sufficient precision in processing.

In comparison, it is possible to place the workpiece on a continuous flat support surface and thus substantially prevent sag. Owing to the unavoidable roughness of the support surface, however, local deformations of the workpiece, which are substantially smaller but, for example, in the production of structures in the micron and submicron range, are still troublesome, cannot be completely ruled out in this case too. Moreover, there is a not insignificant risk that the workpiece will be scratched by direct contact with the support surface or its surface would be damaged in another manner. This can lead to waste, especially in the processing of substrates for the semiconductor industry, such as large-area wafers.

SUMMARY OF THE INVENTION

It is the object of the invention to provide a table which permits highly accurate processing of the workpiece by lasers or other processing devices without endangering the workpiece surface through direct contact with the support surface. This object is achieved by the features in the characterizing clause of Claim 1. In addition, it is intended to provide a suitable method for processing a workpiece on the table according to the invention. This object is achieved by the features of Claim 18.

Because the workpiece, the plate or the glass plate is supported on an air cushion, the present invention has the decisive advantage that, during processing of the plate-like workpiece, the underside thereof does not come into contact with the top of the table, with the result that undesired soiling or scratching of the underside of the plate or damage to said underside, for example by the table surface or particles is avoided. Furthermore, sagging or bending of the substrate can be avoided by supporting the workpiece on an air cushion. By adjusting the pressure conditions, it is moreover possible to regulate the height within certain limits, which is advantageous in some of the treatment steps. Moreover, the air or gas cushion described permits a (quasi-)friction-free transport of the workpiece on the tabletop.

Disc-like or plate-like workpieces, for example glass panes, glass substrates, ceramic plates, wafers of semiconductor material, such as silicon, are to be considered here in particular as workpieces. These plates may reach areas of, for example, 2 m$^2$ or more and at the same time have a thickness of, for example, only 1 mm or less, i.e. may have a large area but may be thin, and they consist as a rule of a brittle material, such as glass or ceramic.

The device of the invention preferably has a table or a tabletop, which is composed of at least two segments. That surface of a segment which faces the workpiece has a plurality of outlet orifices or outlet channels extending equidistant to one another and arranged in rows for the pressurized gas of the pressure-device, which orifices or channels are coupled to the pressure device so as to permit passage of fluid. The outlet orifices of the pressurized gas are distributed uniformly over substantially the entire top of the table, with the result that a uniform pressure is generated on the workpiece supported on the air cushion and hence undesired bending of the workpiece plate is avoided.

The device of the invention preferably has a suction apparatus for sucking the pressurized gas from the top face of the table which faces the workpiece or of the tabletop. This has the advantage that the prevailing fluid pressure in the supporting gas cushion can be controlled via the pressure difference between the pressure side at high pressure and the suction side at at least lower pressure. Consequently, the pressure in the gas cushion or air cushion can also be set in such a way that the disc-like workpiece maintains the specified processing height for the processing.

The table (or in the same context a segment) preferably has, on its surface facing the workpiece, a plurality of suction orifices which are uniformly distributed over the top face of the table or of the tabletop and which are coupled to the suction apparatus so as to permit passage of fluid. This permits uniform suction, viewed over the entire top face of the table or top face of the segment, and thus also achieves on the workpiece a resultant pressure distribution distributed and prevailing uniformly over the entire table or segment area. The table of the invention preferably has, in or on its top face-facing the workpiece, a plurality of suction channels, suction grooves or depressions as suction orifices which extend equidistant in succession along the longitudinal direction of the table and which—preferably—extend in each case without interruption substantially over the total width of the table, with the result that the suction of fluid or air uniformly over the area is improved.

The suction channels may have a serpentine, zigzag, saw tooth-like and/or meandering suction cross-section. The suction cross-section of the suction orifice can, however, also be round, e.g. circular, or polygonal, e.g. rectangular.

The table or the tabletop of the table is preferably divided in such a way that segments corresponding to tabletop halves are provided in a coplanar manner with formation of a gap, a depression or a space between the segments at the end face. A treatment device which, depending on the object of the device, may have a measuring, testing or processing device can be mounted in the gap. Furthermore, a further processing device can be mounted above the table, over the substrate, spatially offset or in an arrangement which permits simultaneous treatment of the same substrate region from above and below. Depending on the purpose, this in turn may be simultaneous processing but also processing and measurement, which permits, for example, regulation of the processing procedure.

Thus, for example, in the case of laser processing, simultaneous processing of the plates on both sides by means of laser radiation is advantageously permitted through the gap between the segments.

BRIEF DESCRIPTION OF THE DRAWINGS

Below, the invention is explained in more detail with reference to figures which represent only a working example.

DESCRIPTION OF THE PREFERRED EMBODIMENTS

Figure 1:
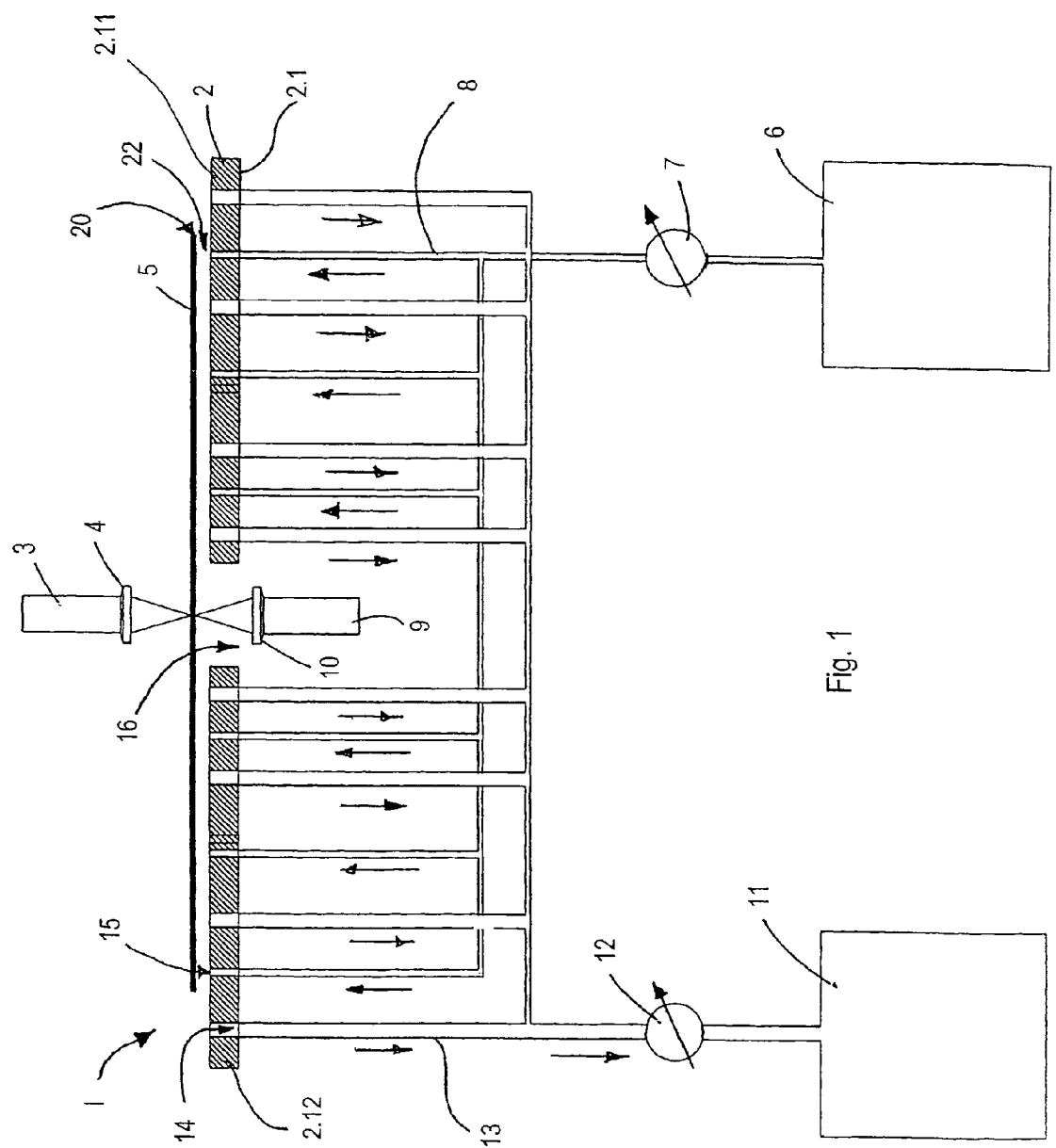
FIG. 1 shows a schematic view of an exemplary embodiment of the table according to the invention.

FIG. 1 shows a device 1 comprising a table 2 according to the invention; shown schematically as a processing device is a laser apparatus, a flow generation apparatus having a take-off apparatus 11 and a pressure generation apparatus 6 which releases a pressurized fluid, e.g. nitrogen or another gas or gas mixture, in this case air. The disc-like workpiece 5 is, for example, a glass plate, a ceramic plate or another plate of brittle substrate material which is to be processed by means of the laser apparatus. In the present exemplary and preferred embodiment of the invention according to FIG. 1, the disc-like workpiece 5 is a substrate ceramic plate or a glass substrate plate.

The table 2 substantially comprises a tabletop 2.1 which forms a support surface facing upwards. It comprises two segments which are in the form of two rectangular halves 2.11 and 2.12 of equal size. The top faces 17.1 and 17.2 of the segments 2.11, 2.12 each form an extensive section of the support surface of the table 2, which faces the disc-like workpiece 5, and have, on their surface, a multiplicity of outflow orifices 15 from which pressurized air flows and a multiplicity of take-off orifices 14 via which pressurized air is at least partly sucked from the top faces 17.1, 17.2 of the table halves 2.11 and 2.12.

Figure 2:
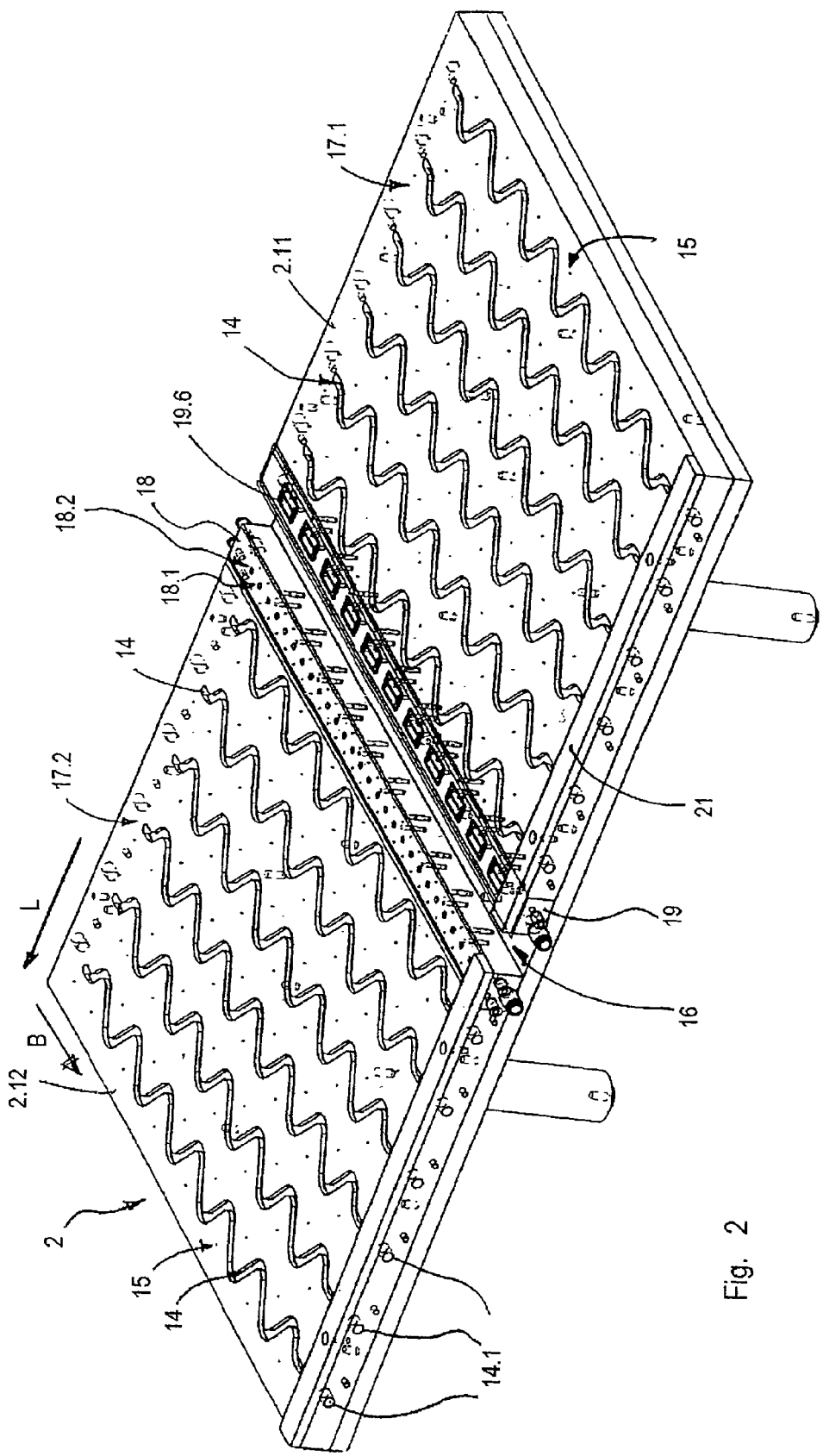
FIG. 2 shows a perspective view which shows the table of the embodiment of the device of the invention of FIG. 1 separated out.

On the top face 17.2 of the table half 2.12 and on the top face 17.1 of the table half 2.11, the take-off orifices 14 are in the form of grooves, depressions or channels which are open at the top and in plan view each have a zigzag or serpentine take-off cross-section substantially over the entire width B of the tabletop halves 2.12 and 2.11 in an uninterrupted manner. Thus, FIG. 2 shows six take-off orifices 14 having the same shape, which, viewed in the feed direction of the workpiece 5, i.e. in the longitudinal direction L of the table 2, are formed equidistant one behind the other. The tabletop half 2.11 also has six serpentine take-off orifices 14 formed equidistant one behind the other. The take-off orifices 14 are distributed uniformly substantially over the entire top face 17.1 or 17.2 of the tabletop halves 2.12 and 2.11 in such a way that uniform take-off of the gaseous medium over the entire tabletop surface can be ensured. Outflow orifices 15 or outlet nozzles having a circular outlet cross-section are formed between the windings of the serpentine take-off orifices 14 equidistant in succession, viewed both in the longitudinal direction L and in the width direction B of the tabletop 2.1. Their diameter is preferably between 0.1 mm and 2 mm, but may also be between 0.05 mm and 10 mm, depending on the application. The outflow orifices 15 are shown in FIG. 2 in each case as a point and thus have a considerably smaller orifice cross-section in each case in comparison with the groove-like take-off orifices 14 which provide a relatively larger take-off cross-section. The outflow orifices 15, too, are uniformly distributed over the entire tabletop 2.1, i.e. the tabletop halves 2.11 and 2.12.

A gap 16 or space which extends, in the example, over the entire width of the table 2 is provided between the two segments 2.11 and 2.12. A square 18 of the table 2 whose top face is flush with the top face 17.2 of the tabletop half 2.12 is inserted between the gap 16 and the tabletop half 2.12, i.e. the top face of the square 18 is coplanar with the top face 17.2 of the tabletop half 2.12. Opposite the square 18, and a distance away therefrom, a further square 19 whose surface is flush with the top face 17.1 of the tabletop half 2.11 is inserted into the gap 16, i.e. the top face thereof is coplanar with the top face 17.1 of the tabletop half 2.11.

Two rows of outflow orifices 18.1 are formed on the top of the square 18, the outflow orifices 18.1 per row being formed equidistant in succession over the entire width of the tabletop 2.1 or the length of the square 18. Viewed in the longitudinal direction L, the two rows of outflow orifices 18.1 are provided a distance apart and parallel to one another. Between the two rows with outflow orifices 18.1, a row of take-off orifices 18.2 is distributed over the entire length of the square 18, the individual take-off orifices 18.2 in turn being arranged equidistant in succession. In the region between two take-off orifices 18.2 in each case, two outflow orifices in each case are thus arranged approximately on an imaginary centre line between these respective two take-off orifices 18.2. Viewed in the longitudinal direction L of the tabletop 2.1, the respective two outflow orifices 18.1 therefore do not lie on a common, imaginary line with the adjacent take-off orifice 18.2, but the outflow orifices 18.1 are staggered relative to the take-off orifices 18.2. The take-off orifices 18.2 and outflow orifices 18.1 of the square 18 are distributed uniformly over the top thereof.

Figure 3:
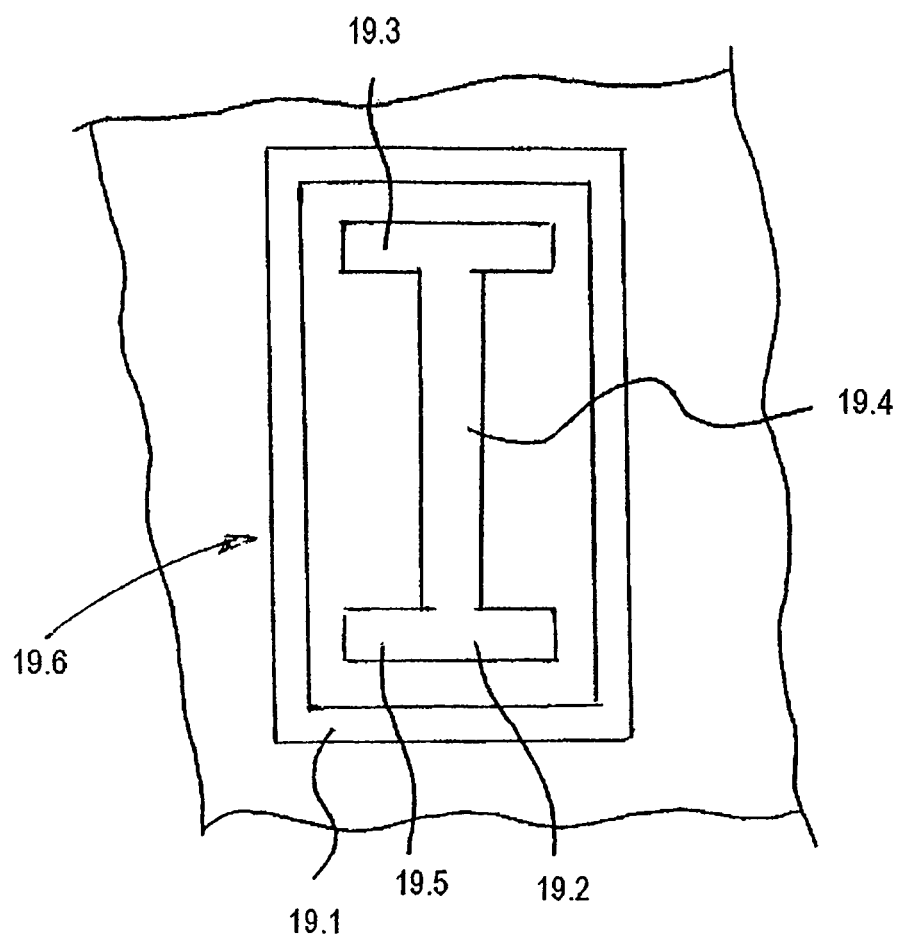
FIG. 3 shows a plan view of a cut-out group of orifices which is used in the embodiment of the device of the invention in FIG. 2

The square 19 has, on its top face, a multiplicity of groups of orifices 19.6 (cf. FIG. 3) which are arranged in a row equidistant in succession over the entire width B of the table 2 or along the entire length of the square 19. Each group of orifices 19.6 has a take-off orifice 19.2 and an outflow orifice 19.1 which surrounds the take-off orifice 19.2 in a frame-like or annular manner. More precisely, in the exemplary embodiment of the invention which is shown, the take-off orifice 19.2 has a longitudinal section 19.4 extending in the longitudinal direction of the square 19 and two transverse sections 19.5 and 19.3 which are continuous with the ends of the longitudinal section 19.4 and extend transversely to the longitudinal section 19.4. The take-off orifice 19.2 thus has a double T-shaped take-off cross-section on the surface or top of the square 19. The outflow orifice 19.1 has an outlet cross-section in the form of a rectangular frame which continuously surrounds the double T-shaped take-off orifice 19.2. Altogether, eleven of these groups of orifices 19.6 are formed in a row in FIG. 2. The two illustrated formations and arrangements of the orifices on the squares 18, 19 are alternatives which correspond to preferred embodiments. They permit in particular easy sliding of the workpiece on the extensive section which follows the gap 16 in the feed direction. Preferably, two identically formed squares 18, 19 are used, but this need not be the case.

All take-off orifices 14, 18.2 and 19.2 are coupled to a take-off pipe network 13 so as to permit passage of fluid, for example via the take-off connections 14.1 and channels which are formed in the tabletop halves 2.11 and 2.12 which are merely indicated in the drawings. The take-off pipe network 13 is in turn coupled to the take-off apparatus 11 so as to permit the passage of fluid, which take-off apparatus may be, for example, a diaphragm pump or water jet pump and removes the gas or air from the top of the tabletop 2.1 and the square 18 and 19. A vacuum control valve 12 which can be controlled, for example, by means of a microprocessor apparatus and software and corresponding electronics is arranged between the take-off pipe network 13 and the take-off apparatus 11 so as to permit passage of fluid.

The outflow orifices 15, 18.1 and 19.1 are coupled to a pressure pipe network 8, for example via corresponding pipe connections and inner channels in the tabletop halves 2.11 and 2.12 and in the squares 18 and 19, so as to permit passage of fluid, the pressure pipe network 8 in turn being coupled, so as to permit passage of fluid, to a pressure generation apparatus 6 which is designed, for example, as a compressor which provides the air and the pressure on the exit side. A pressure control valve 7 which may be electronically controlled or regulated, once again via, for example, a microprocessor apparatus, is installed between the pressure pipe network 8 and the pressure generation apparatus 6 so as to permit passage of fluid. As a result, pressures between 0.1 bar and 1.5 bar above ambient pressure are established.

The laser apparatus comprises, for example, two laser units 3, 9 which emit a laser beam in the direction of the top of the table 2 or of the tabletop 2.1 for processing a top of the disc-like workpiece 5 or emit a laser beam in the direction of the bottom of the disc-like workpiece 5 within the gap 16 between the tabletop halves 2.12 and 2.11 in order to be able to process the bottom of the disc-like workpiece 5 with laser beams. The first laser beam (cf. FIG. 1) arriving from the laser unit 3 passes through a focussing apparatus 4 which focuses the laser beam onto the top of the disc-like workpiece 5 while the second laser beam arriving from the further laser unit 9 passes through a focussing unit 10 which focuses the laser beam onto the bottom of the disc-like workpiece 5. The disc-like workpiece 5 can thus be processed both on its bottom and on its top simultaneously by the preferred embodiment of the device.

Figure 4:
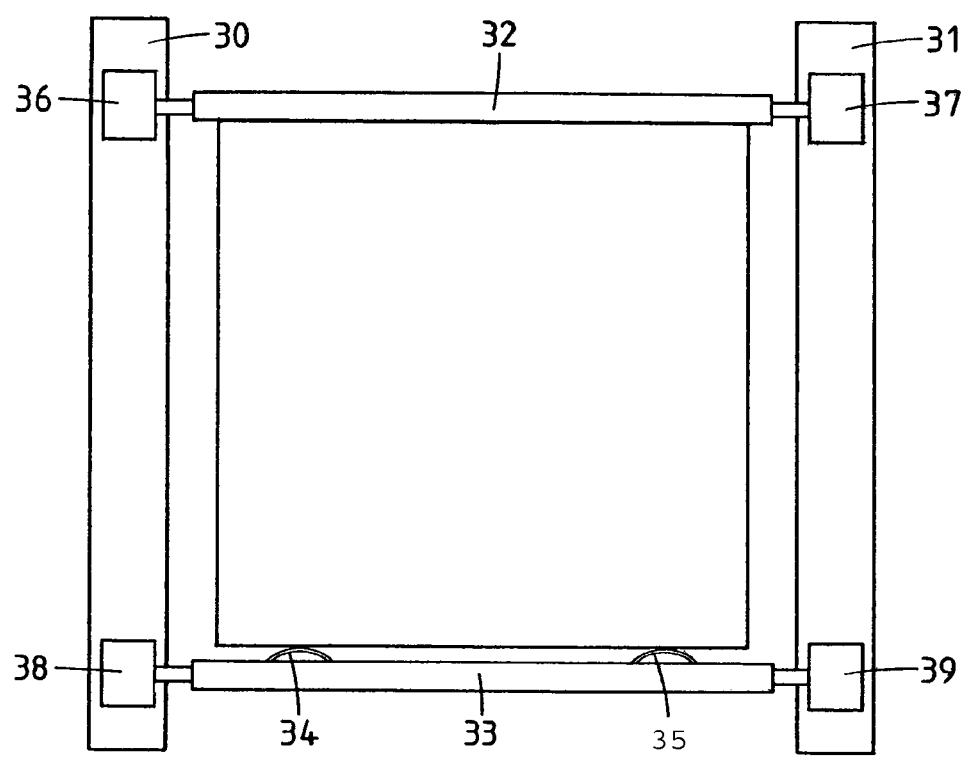
FIG. 4 shows a plan view of a holder for a workpiece and a linear guide for said holder on the top of the table according to the invention.

The feeding of the disc-like workpiece 5 in the longitudinal direction L of the table 2 is carried out by means of a feed apparatus (FIG. 4). It comprises a linear guide having two rails 30, 31 which are fixed at edge strips 21 arranged at the opposite lateral edges of the segments 2.11, 2.12 of the table 1 and which run transversely over the gap 16. They may be, for example, in the form of semi-circular profiles. A receptacle for the workpiece 5, which consists of two holders 32, 33 a distance apart in the longitudinal direction and independently displaceable, is guided in the linear guide. The first holder 32 has stops for the edge of the workpiece which act in the longitudinal direction and permit said workpiece to be positioned accurately in the receptacle, while the second holder 33 carries a pressure apparatus which consists, for example, of two arc-shaped steel springs 34, 35 or pneumatically actuatable cylinders and presses the workpiece 5 against the stops. Each of the two holders 32, 33 is guided on both sides in the rails 30, 31. A drive apparatus which comprises linear motors 36, 37 and 38, 39 having in each case wheels which are tailored to the rails 30, 31 and which in each case drive the first holder 32 and the second holder 33, respectively, serves for displacing the receptacle in a precisely controllable manner with the workpiece 5 over the gap 16 so that said workpiece can be successively processed by the laser beams 3, 9. The first holder 32 also has an element, for example a pneumatic element, for height adjustment, which element makes it possible to adjust stops for supporting the workpiece in height. Thus, the front edge of the workpiece 5 can be adjusted to a certain required height. The remainder of the workpiece 5 is then adjusted to the same height by regulating the air cushion by means of the pressure control valves 7, 12. Thereafter, the workpiece 5 is contacted by the second holder 33 and pressed in a controlled manner and thus fixed.

Instead of the holders 32, 33, however, it is also possible to provide a one-part height-adjustable frame on which the workpiece is supported.

The laser beam emitted by the laser unit 3 or 9 together with the respective coordinated focussing apparatuses 4 and 10, respectively, can be deflected over the width B of the table 2 or of the workpiece 5 by means of a deflection apparatus, for example a galvano mirror or a movable deflection mirror. During the feed, the disc-like workpiece 5 is guided at its lateral edges by edge strips 21 of the table 2.

Alternatively, the feeding and the guidance of the disc-like workpiece can be designed so as to be non-contact, for example by appropriate control of the air stream or by laterally mounted additional gas inflow orifices.

If it is intended to process the surface of the disc-like workpiece 5, the pressure generation apparatus 6 and the take-off apparatus 11 are put into operation, with the result that the pressure generation apparatus 6 feeds pressurized air via the pressure control valve 7 and the pressure pipe network 8 to the outflow orifices 15 of the two tabletop halves/segments 2.11 and 2.12 and the outflow orifices 18.1 of the square 18 and the outflow orifices 19.1 of the square 19. The pressurized air flows out of the outflow orifices at the top of the tabletop halves 2.11 and 2.12 and the square 18 and 19 at high pressure. The disc-like workpiece 5 is then placed on the table 2 and is coupled to the feed apparatus as described. The disc-like workpiece 5 is kept raised above the top or surface of the table 2 by the air cushion generated. This support of the disc-like workpiece 5 by air cushion takes place uniformly over the entire top of the table or table area, since the outflow orifices 15 and the take-off orifices 14 are uniformly distributed apart from the gap region. Since the disc-like workpiece 5 is thus supported on an air cushion or a gas flow between the bottom of the disc-like workpiece 5 and the tops 17.1 and 17.2 of the table, said workpiece cannot come into contact with the top of the table 2.

At the same time, take-off is effected via the take-off orifices 14, 18.2 and 19.2 at the top of the table 2 by the take-off apparatus 11 via the take-off pipe network 13 and the vacuum control valve 12, with the result that the pressure of the air flow at the top of the table 2 can be adjusted via the pressure difference between the feed side and the take-off side in such a way that the disc-like workpiece 5 is supported securely and steadily at a predetermined height, which corresponds to the processing height of the disc-like workpiece 5, on the air cushion generated between the disc-like workpiece 5 and the top of the table 2. The distance of the workpiece from the support surface can be adjusted, for example, to a value between 0.01 mm and 1 mm, preferably between 0.05 mm and 0.3 mm. The precise adjustment of this processing height is important particularly when the processing device is a laser apparatus, since the workpiece or the region to be processed must be kept in the focus of the laser.

It is often sufficient to adjust the height of the workpiece 5 once and to fix said workpiece as described further above. Said height could also be checked once by providing a measuring apparatus with suitable measuring means which determine the height, for example interferometrically or by triangulation methods and are distributed in the gap 16 or over the table. In the former case, the workpiece 5 can be moved once over the gap 16 and its uniform height position can be checked; in the latter case, the check can be effected rapidly by the distributed measuring means. The height of the workpiece 5 can also be kept constant during the processing by feedback. The workpiece 5 can be positioned with the aid of the measuring apparatus over the gap with an accuracy of 50 µm to 100 µm, the height of the workpiece being measured by the measuring apparatus with an accuracy of 1 μm and the gas pressure could then be regulated via a suitable control loop by means of the pressure valves 7, 12. The focus of the laser can also be regulated for compensating small irregularities of the workpiece 5.

With the device of the invention, various workpiece processing operations can be carried out with simultaneous processing of the bottom and also of the top of the workpiece 5. For example, material can be removed from the top or the bottom of the workpiece 5 by means of the laser beam in order, for example, to be able to form conductor tracks on the workpiece, or the workpiece can be marked or scored by means of a laser. In the case of a transparent workpiece 5, it is also possible, for example, to process a coating on the top from the bottom through the workpiece 5.

A special case of material removal is so-called "laser scribing", in which certain regions on a thin substrate provided with a continuous conductive coating are to be electrically insulated. For this purpose, the conductive layer is deliberately removed along a line by means of a laser (the method is known as laser ablation) and the bordering areas thus electrically insulated. For this purpose, the workpiece is supported on a table according to the invention on the gas or air cushion without contact and moved back and forth over the treatment device (laser) provided between the segments 2.11 and 2.12 in the gap 16 in the longitudinal direction L of the table 2. The movement in the transverse direction of the table can be achieved by movement of the treatment device in the gap 16; in combination with the longitudinal movement, lines can be inscribed on the substrate in a known manner.

Frequently, it is necessary to provide markings on the workpiece which make it possible to establish the position of the workpiece relative to the table or to the treatment device. These markings are advantageously produced as crosses or orientation lines. The application of the markings can be effected in an upstream process, for example by printing or in a photolithographic exposure process. Advantageously, however, the markings can also be effected by means of the device according to the invention via lasers, for example in a first operation. In addition to the laser as a processing device, it is particularly advantageous for this purpose to provide a detector for the markings, for example a pattern recognition device as a measuring device. This can be provided in a fixed location at a plurality of points in or on the table, which makes it possible to monitor a plurality of markings simultaneously. In one embodiment, the measuring device can, however, also be provided in or above the gap 16, preferably on a movement device, such as the processing device (laser) or even combined therewith.

The position monitoring via the markings moreover makes it possible to design the feed and guide devices so that the precision of the positioning need not be ensured by them. This is necessary particularly when the support and guidance is effected in a non-contact or substantially non-contact manner.

The markings are moreover important if the substrate has to be inscribed several times, for example between various coating processes, which each deposit layers of material on the workpiece. Thus, it is possible to ensure that the orientation of the workpiece is recognized again and the new lines to be inscribed follow a predetermined pattern. The accuracy requirements in such cases are 5 to 500 μm. However, accuracies of 10 μm are readily achievable on approaching markings again, especially since the control of the movement of the workpiece can meet substantially higher accuracy requirements and may be, for example, 1 μm. Said accuracies apply in each case to the positioning transversely to the gap as well as parallel to the gap.

Moreover, the markings in the form of, for example, a barcode may also serve for identifying the workpiece. Thus, an individual inscription pattern can be provided per workpiece and the unique identification of the workpiece is ensured via the marking. If measuring and testing devices are also provided in addition to a processing device, the device therefore also makes it possible unambiguously to coordinate test specimen and measured data.

In another application, the device according to the invention can also be used for parting or cutting disc-like workpieces, for example of glass plates or ceramic plates. Here, the laser-induced cutting of plates can be used. The device of the invention cuts the plate or the workpiece 5 by moving the laser beam along a cutting line, the glass plate being heated along the cutting line but not being melted. The heating of the plate along the cutting line is followed by cooling along the cutting line by a cooling medium, for example a cooled air jet, resulting in stresses along the cutting line in the plate which lead to an exact break of the glass plate along the cutting line. By means of the support of the plate or of the glass plate by an air cushion in the device of the present invention, the bottom of the plate does not come into contact with the surface of the table even in the case of laser-induced cutting of the plate, with the result that undesired soiling or undesired scratching of the bottom of the plate or damage to the bottom of the plate by the surface of the table is avoided.

The table may also have a plurality of successive gaps which are separated from one another, for example, by squares and in each of which a processing device is arranged. Thus, a plurality of processing operations can take place simultaneously.

The invention claimed is:

1. A device for processing a workpiece, comprising:
   a table having a flat support surface for holding the workpiece where the support surface comprises at least two surface sections which follow one another in a longitudinal direction and are separated by a gap running transversely to the longitudinal direction and where, in each surface section, outflow orifices for feeding compressed gas for producing a gas cushion between each said surface section and a bottom of the workpiece are distributed over the surface sections;
   a feed apparatus and a receptacle for the workpiece and a drive device suitable for displacing the receptacle in the longitudinal direction across the gap;
   a processing device for processing the workpiece, the processing device comprising at least one laser unit directed towards the gap;
   at least one detector for markings, the detector being used for controlling the position of the workpiece, the workpiece having thereon, a plurality of said markings that are detected by the detector to establish a position of the workpiece relative to the table or to the processing device; and
   a plurality of groups of orifices arranged in a row in succession over an entire width of the table, each group of orifices having a take-off orifice and an outflow orifice which surrounds the take-off orifice.

2. The device of claim 1, where the processing device is arranged below the gap.

3. The device of claim 1, wherein to focus the at least one laser unit the at least one laser unit is adjustable in height.

4. The device of claim 1, where the feed apparatus comprises a linear guide traversing the gap in the longitudinal direction.

5. The device of claim 1, where the processing device is arranged below the gap.

6. The device of claim 1, wherein to focus the at least one laser unit the at least one laser unit is adjustable in height.

7. A device for processing a workpiece, comprising:
- a table having a flat support surface for holding the workpiece where the support surface comprises at least two surface sections which follow one another in a longitudinal direction and are separated by a gap running transversely to the longitudinal direction and where, in each surface section, outflow orifices for feeding compressed gas for producing a gas cushion between each said surface section and a bottom of the workpiece are distributed over the surface sections;
- a feed apparatus and a receptacle for the workpiece and a drive device suitable for displacing the receptacle in the longitudinal direction across the gap;
- a processing device for processing the workpiece, the processing device comprising at least one laser unit directed towards the gap;
- at least one detector for markings, the detector being used for controlling the position of the workpiece, the workpiece having thereon, a plurality of said markings that are detected by the detector to establish a position of the workpiece relative to the table or to the processing device;
- the at least one detector being arranged in the gap or above the gap; and
- a plurality of groups of orifices arranged in a row in succession over an entire width of the table, each group of orifices having a take-off orifice and an outflow orifice which surrounds the take-off orifice.

8. The device of claim 7, where the at least one detector is mounted on a movement device.

9. The device of claim 8, where the at least one detector is mounted on the movement device together with the processing device.

10. The device of claim 9, where the feed apparatus comprises a linear guide traversing the gap in the longitudinal direction.

11. A device for processing a workpiece, comprising:
- a table having a flat support surface for holding the workpiece where the support surface comprises at least two surface sections which follow one another in a longitudinal direction and are separated by a gap running transversely to the longitudinal direction and where, in each surface section outflow orifices for feeding compressed gas for producing a gas cushion between each said surface section and a bottom of the workpiece are distributed over the surface sections;
- a feed apparatus and a receptacle for the workpiece and a drive device suitable for displacing the receptacle in the longitudinal direction across the gap;
- a processing device for processing the workpiece, the processing device comprising at least one laser unit directed towards the gap;
- at least one detector for markings, the detector being used for controlling the position of the workpiece, the workpiece having thereon, a plurality of said markings that are detected by the detector to establish the position of the workpiece relative to the table or to the processing device; and
- a plurality of groups of orifices arranged in a row in succession over an entire width of the table, each group of orifices having a take-off orifice and an outflow orifice which surrounds the take-off orifice, the take-off orifices removing said compressed gas from between the bottom of the workpiece and a respective surface section adjacent the groups of orifices.

12. The device of claim 11, where the at least one detector is arranged in the gap or above the gap.

13. The device of claim 12, where the at least one detector is mounted on a movement device.

14. The device of claim 13, where the at least one detector is mounted on the movement device together with the processing device.

15. The device of claim 14, where the feed apparatus comprises a linear guide traversing the gap in the longitudinal direction.

16. The device of claim 11, wherein the row of groups of orifices extends adjacent the gap.

17. The device of claim 11, wherein each outflow orifice in each group of orifices, surrounds the take-off orifice in each respective group in a frame-like manner.

18. The device of claim 11, wherein each outflow orifice in each group of orifices, is rectangular and continuously surrounds the take-off orifice in each respective group.

19. The device of claim 11, wherein each take-off orifice in each respective group, has a double T-shape.

20. The device of claim 11, wherein each outflow orifice in each group of orifices, is rectangular and continuously surrounds the take-off orifice in each respective group, each take-off orifice in each respective group having a double T-shape.

* * * * *